(12) United States Patent
Fuentes et al.

(10) Patent No.: US 12,090,825 B2
(45) Date of Patent: Sep. 17, 2024

(54) REAR DOOR ASSEMBLY

(71) Applicant: NISSAN NORTH AMERICA, INC., Franklin, TN (US)

(72) Inventors: Bobby Fuentes, Clarkston, MI (US); Slavomir Borkowski, Commerce Township, MI (US); John Corless, Waterford, MI (US); Craig Bosanko, Canton, MI (US); Christopher Thompson, Lake Orion, MI (US)

(73) Assignee: Nissan North America, Inc., Franklin, TN (US)

( * ) Notice: Subject to any disclaimer, the term of this patent is extended or adjusted under 35 U.S.C. 154(b) by 426 days.

(21) Appl. No.: 17/589,846

(22) Filed: Jan. 31, 2022

(65) Prior Publication Data
US 2023/0241949 A1    Aug. 3, 2023

(51) Int. Cl.
*B60J 5/10* (2006.01)
*E05B 81/56* (2014.01)
(Continued)

(52) U.S. Cl.
CPC ............... *B60J 5/106* (2013.01); *E05B 81/56* (2013.01); *E05D 15/582* (2013.01); *E05F 15/53* (2015.01); *E05D 2015/586* (2013.01); *E05Y 2201/456* (2013.01); *E05Y 2201/626* (2013.01); *E05Y 2201/64* (2013.01); *E05Y 2201/654* (2013.01); *E05Y 2201/684* (2013.01); *E05Y 2400/32* (2013.01); *E05Y 2400/40* (2013.01); *E05Y 2800/102* (2013.01); *E05Y 2900/546* (2013.01)

(58) Field of Classification Search
CPC .... B60J 5/10; B60J 5/101; B60J 5/106; E05D 15/30; E05D 15/38; E05D 15/565; E05D 15/582; E05F 15/53
USPC .......................................... 296/50, 56, 146.8
See application file for complete search history.

(56) References Cited

U.S. PATENT DOCUMENTS 4,620,743 A * 11/1986 Eke ............................ B60J 5/12
  49/197
5,921,611 A    7/1999 Townsend
(Continued)

FOREIGN PATENT DOCUMENTS

CN           1590196 A        3/2005
KR       10-0512188 B1        9/2005
(Continued)

*Primary Examiner* — Jason S Daniels
(74) *Attorney, Agent, or Firm* — Global IP Counselors, LLP (57) ABSTRACT

A rear door assembly includes a rear opening and a roof structure having a recessed area. A carrier is movable along a portion of the recessed area between a rearward location to a forward location. A motor is attached to the carrier and the vehicle. The motor is operable to move the carrier relative to the roof structure and the rear opening between the rearward location and the forward location. A rear door has a hinge pivotally supported to the carrier for movement therewith. The rear door is movable between a door closed orientation covering the rear opening, an intermediate orientation partially exposing the rear opening and a door open orientation exposing the rear opening. A linear movement device has a first end attached to the carrier for movement therewith and a second end attached to the rear door at a location spaced apart from the hinge.

16 Claims, 7 Drawing Sheets

(51) Int. Cl.
  *E05D 15/58*  (2006.01)
  *E05F 15/53*  (2015.01)

(56) References Cited

U.S. PATENT DOCUMENTS

| | | | | |
|---|---|---|---|---|
| 5,997,072 A | * | 12/1999 | Parkinson | B60J 5/12 |
| | | | | 296/146.8 |
| 6,234,563 B1 | | 5/2001 | Bascou | |
| 6,386,613 B1 | | 5/2002 | Vader | |
| 6,505,878 B1 | * | 1/2003 | Mascolo | B60J 7/04 |
| | | | | 296/146.16 |
| 7,188,863 B2 | | 3/2007 | Tiesler et al. | |
| 7,828,366 B2 | | 11/2010 | Andre et al. | |
| 8,020,912 B2 | | 9/2011 | Lounds | |
| 8,132,846 B2 | * | 3/2012 | Kitayama | B60J 1/1884 |
| | | | | 296/216.02 |
| 8,376,449 B2 | | 2/2013 | Kitayama et al. | |
| 2023/0134202 A1 | * | 5/2023 | Morioka | B60J 5/106 |
| | | | | 49/218 |

FOREIGN PATENT DOCUMENTS

| | | |
|---|---|---|
| KR | 10-1068172 B1 | 9/2011 |
| WO | 2005/080108 A1 | 9/2005 |
| WO | 2015/097321 A1 | 7/2015 |

\* cited by examiner

REAR DOOR ASSEMBLY

BACKGROUND

Technical Field

The present disclosure generally relates to a rear door assembly of a vehicle that includes a rear opening. More specifically, the present disclosure relates to rear door assembly with a rear door that pivots upward exposing a rear opening of the vehicle and thereafter the rear door moves forward such that at least half of the rear door is located above a roof structure of the vehicle.

Background Information

Sports utility vehicles, vans and other automotive structures can include a rear door that pivots upward to expose a rear opening of the vehicle. Due to design constraints and dimensional constraints, such rear doors typically can only pivot up to an open orientation where the majority of the rear door is only slightly higher that the top of the rear opening of the vehicle. With the rear door in the open orientation, the rear door when open can create difficulties is instances where irregularly shaped objects are desired to be placed within the rear of the vehicle. Further, with the rear door in the open orientation, the rear door can also create difficulties for tall persons loading objects into the rear of the vehicle.

SUMMARY

One object of the present disclosure is to provide a vehicle that includes a rear opening with a rear door that pivots upward and is then moved forward relative to the rear opening such that at least half of the rear door is located above a rear portion of a roof structure of the vehicle.

In view of the state of the known technology, one aspect of the present disclosure is to provide a rear door assembly with a vehicle body structure, a carrier, a motor, a rear door and a linear movement device. The vehicle body structure has a roof structure with a rear portion of the vehicle body structure defining a rear opening. The carrier is movable along a portion of the roof structure between a rearward location to a forward location. The motor is attached to the roof structure and the carrier. The motor is operable to move the carrier relative to the roof structure and the rear opening between the rearward location and the forward location. The rear door has a hinge pivotally supported to the carrier for movement therewith. The rear door is movable between a door closed orientation covering the rear opening, an intermediate orientation partially exposing the rear opening and a door open orientation exposing the rear opening. The linear movement device has a first end attached to the carrier for movement therewith and a second end attached to the rear door at a location spaced apart from the hinge.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 and 2, a vehicle 10 having a rear door assembly 12 is illustrated in accordance with a first embodiment.

The vehicle 10 includes a vehicle body structure 14 that includes, among other features and components, side doors 16 and 18, a roof structure 19, side windows 20, 22 and 24 and a rear opening 26 at a rearward area 28 of the vehicle body structure 14 of the vehicle 10. The rear door assembly 12 includes a rear door 30 that is coupled to the vehicle body structure 14 for movement between a closed orientation shown in FIG. 1 and a fully open orientation shown in FIG. 2. The rear door 30 is supported to the vehicle body structure 14 by a carrier 32, a motor 34, a hinge 36 and a linear movement device 40, as described in greater detail below. There are two carriers 32, two motors 34, two hinges 36 and two linear movement devices 40, one of each being installed along respective opposite lateral sides of the rear door 30. Since the carriers 32, the motors 34, the hinges 36 and the linear movement devices 40 are identical to one another and operate in identical manners, only one carrier 32, one motor 34, one hinge 36 and one linear movement device 40 is described herein below for the sake of brevity.

Figure 2:
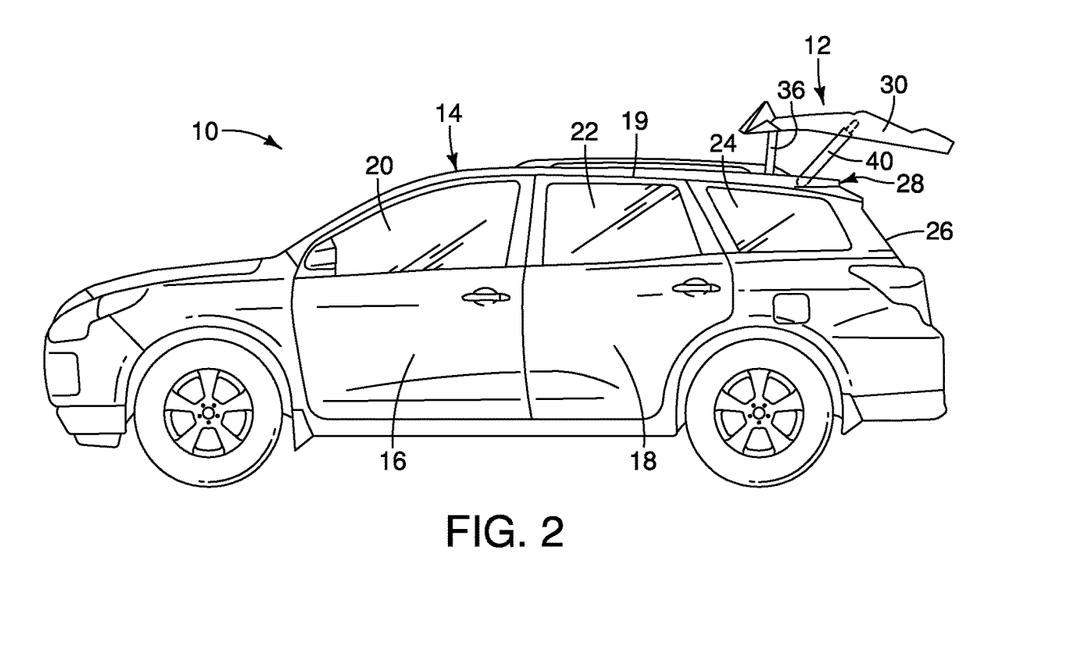
FIG. 2 is another side view of the vehicle similar to FIG. 1 showing the rear door in a fully open orientation with the rear door being at least partially located above a rearward area of the roof structure of the vehicle in accordance with the first embodiment.

As shown in FIGS. 2, with the rear door 30 in the fully open orientation, between 50 and 70 percent of the rear door 30 is located above the roof structure 19 of the vehicle body structure 14 thereby exposing the rear opening 26 to make loading and unloading cargo easier without much, if any, interference from the rear door 30.

Figure 6:
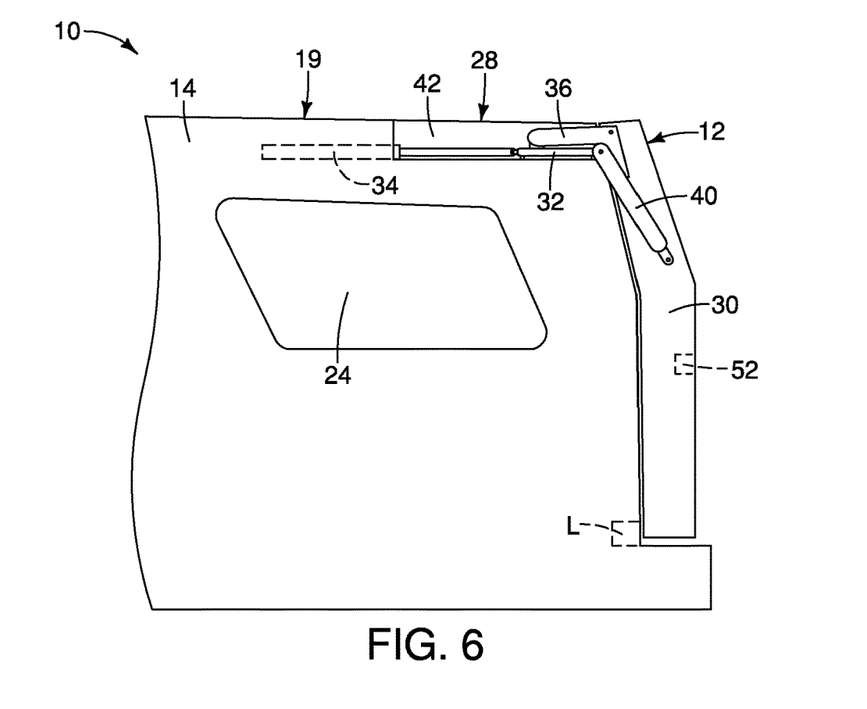
FIG. 6 is a first side schematic view of the rear area of the vehicle showing the rear door in the closed orientation in accordance with the first embodiment.
Figure 7:
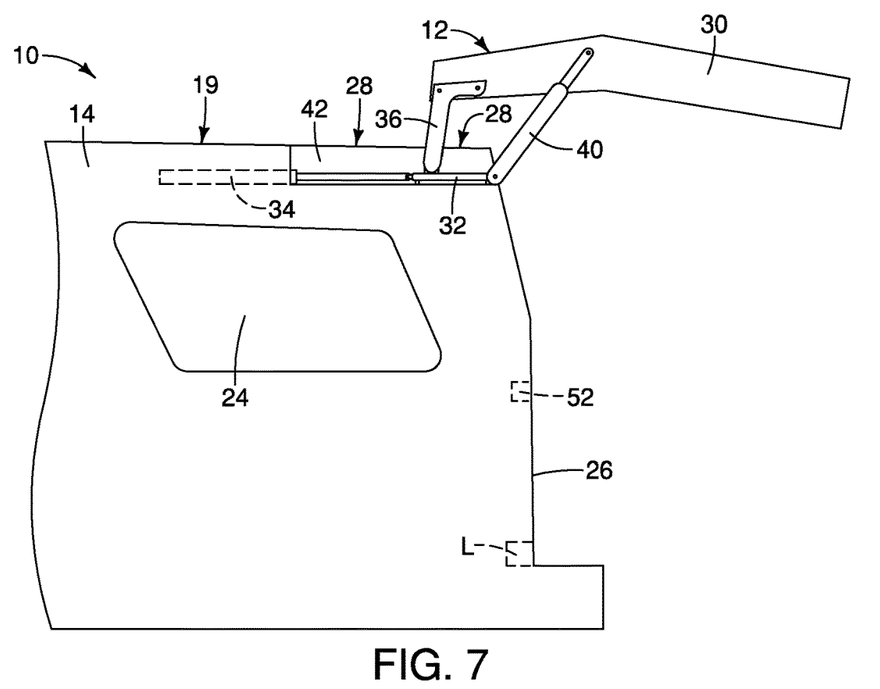
FIG. 7 is a second side schematic view of the vehicle similar to FIG. 6 showing the rear door pivoted upward by the linear movement device relative to the carrier about the hinge of the rear door, with the carrier in a rearward position such that the rear door is in an intermediate orientation in accordance with the first embodiment.
Figure 8:
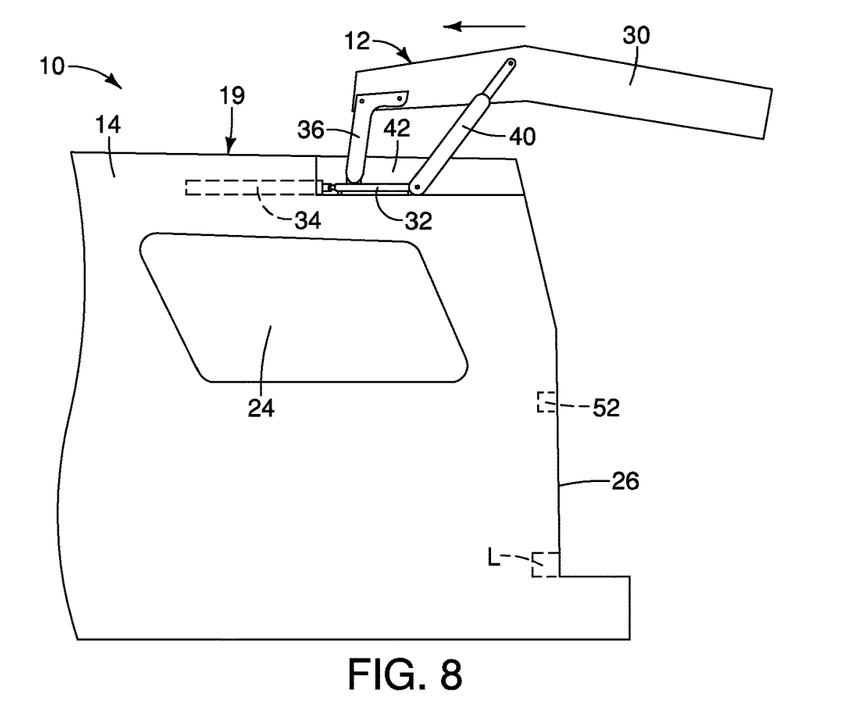
FIG. 8 is a third side schematic view of the vehicle similar to FIGS. 6 and 7 showing the carrier moved to a forward position by the motor such that the rear door moved forward to a fully open orientation exposing the rear opening of the vehicle in accordance with the first embodiment.

In FIGS. 3-8, the vehicle body structure 14 and the rear door 30 are shown schematically with simplified and exaggerated block-like shapes to demonstrate the kinematics of the movement of the rear door 30 from the closed orientation (FIG. 6), to an intermediate orientations (FIG. 7) and to the fully open orientation (FIG. 8).

Figure 1:
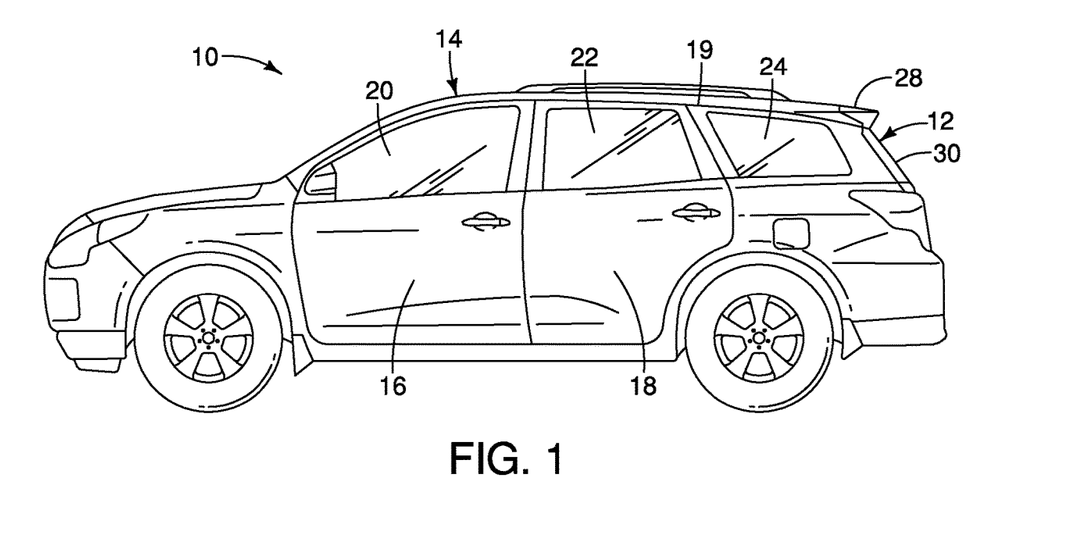
FIG. 1 is a side view of a vehicle that has a rear opening with a rear door, the rear door being in a closed orientation covering the rear opening in accordance with a first embodiment.

The rearward area 28 of the vehicle body structure 14 defines the rear opening 26 that is exposed with the rear door 30 in the open orientation (FIGS. 2 and 8) and covered by the rear door 30 with the rear door 30 in the closed orientation (FIGS. 1 and 6). The roof structure 19 defines a recessed area 42 at the rearward area 28 of the vehicle body structure 14. It should be understood from the drawings and the description herein that there are two recessed areas 44 that are identical to one another, except that they are on opposite lateral sides of the vehicle 10 and are mirror images of one another. Therefore, only one of the recessed areas 44 is described herein below for the sake of brevity.

Figure 3:
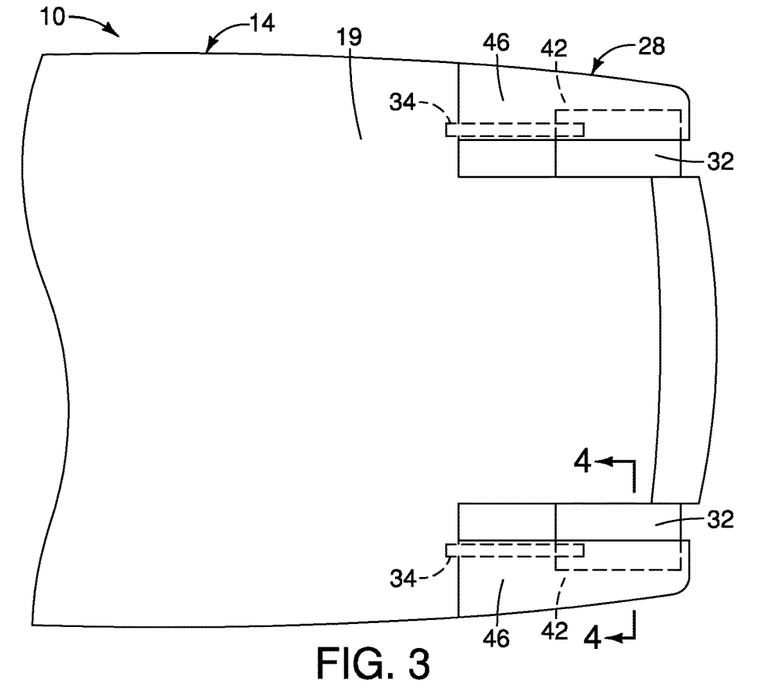
FIG. 3 is a schematic top view of the rearward portion of the vehicle showing the rear door in the closed orientation and recessed area of the roof structure that receives a carrier, a motor and a hinge of the rear door in accordance with the first embodiment.
Figure 4:
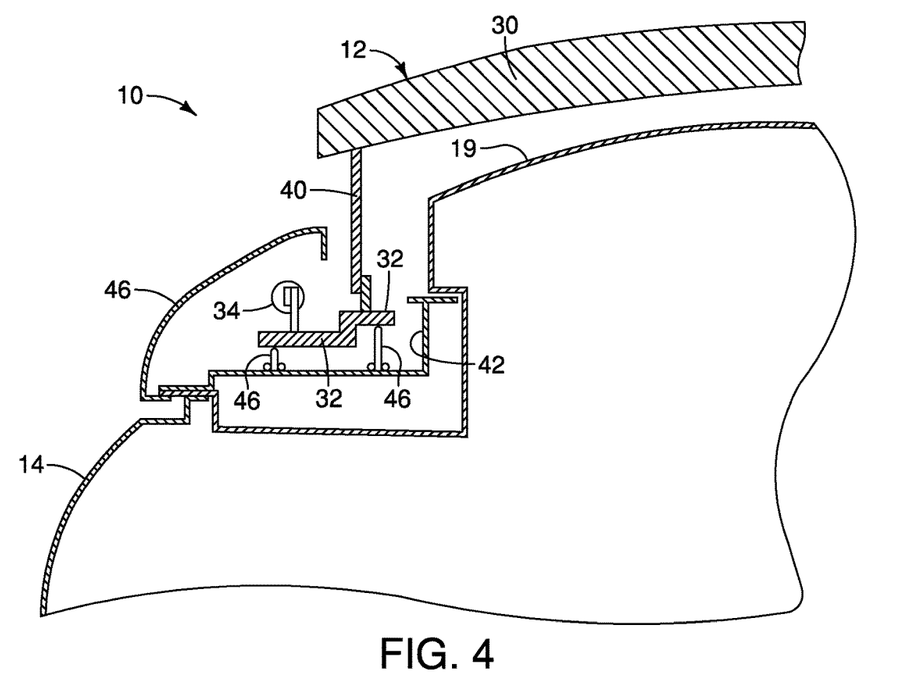
FIG. 4 is a schematic rear cross-sectional view of the vehicle taken along the lines 4-4 in FIG. 3 showing details of the recessed area such as tracks along a generally flat lower surface of the recessed area, the carrier supported on the tracks and the motor in accordance with the first embodiment.

As shown in FIGS. 3 and 4, the recessed area 42 is at least partially concealed by removable trim panels 46. The trim panels 46 are removed in FIGS. 5-8. With the trim panels 46 removed, the elements within the recessed area 42 are visible. The recessed area 42 includes tracks 46 that receive and guide and limit movement of the carrier 32, as described further below. In other words, the carrier 32 is able to roll (on rollers) or slid on friction free runners on the tracks 46 in a direction parallel to the lengthwise direction of the vehicle 10. Hence, the carrier 32 is able to be moved along the tracks 46 within the recessed area 42 of the roof structure 19 between a rearward location (FIGS. 3, 5 and 6) to a forward location (FIG. 8).

As described further below, with the rear door 30 in the intermediate orientation (FIG. 7), the motor 34 is configured to move the carrier 32 and the rear door 30 between the intermediate orientation (FIG. 7) and the door open orientation (FIG. 8). It should be understood from the drawings and the description herein that with the carrier 32 in the rearward location (FIGS. 6 and 7) the rear door 30 is located in the intermediate orientation (FIG. 7) or the closed orientation (FIG. 6). With the carrier 32 moved to the forward location (FIG. 8) the rear door 30 is located in the door open orientation.

The carrier 32 can be provide with rollers (wheels) or runners made of a reduced friction or friction free material such that the carrier 32 rolls or slides along tracks 46. The tracks 46 are fixed to the roof structure within the recessed area 42. As shown in FIGS. 3-8, the recessed area 42 generally flat is approximately parallel to level ground when the vehicle 10 is parked on level ground.

Figure 5:
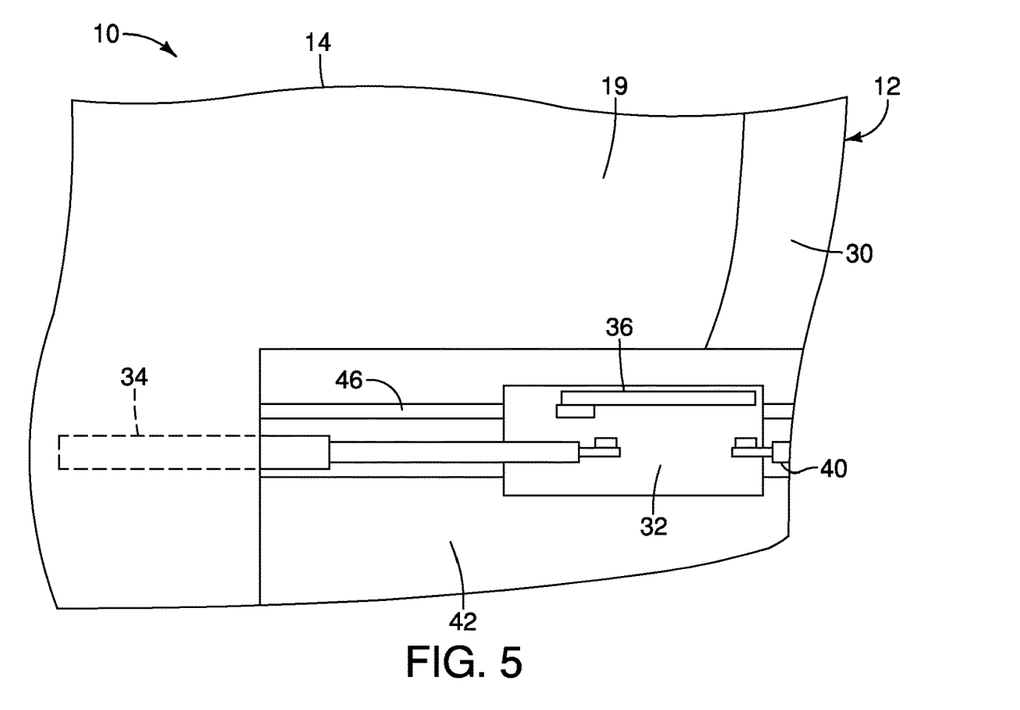
FIG. 5 is a schematic top view of recessed area of the roof structure showing the motor, the carrier, the hinge of the rear door and the linear movement device in accordance with the first embodiment.

As shown in FIGS. 5-8, the recessed area 42 is also configured to receive and retain the motor 34. The motor 34 extends under the roof structure 19 and is attached to the vehicle body structure 14 and the roof structure 19 in a conventional manner. A rearward portion of the motor 34 extends into the recessed area 42 and is operably connected to a front end of the carrier 32 via, for example, a pivot pin or similar connecting structure attached to the carrier 32. When the motor 34 is operated, the motor 34 can position the carrier 32 at any location along the tracks 46 within the recessed area 42 between the forward location (FIG. 8) and the rearward location (FIGS. 5-7).

The hinge 36 is fixedly attached to one lateral side of the rear door 30 via, for example, mechanical fasteners. A pivoting end of the hinge 36 is fixedly attached to a forward area of the carrier 32. Thus, the hinge 36 and the rear door 30 can pivot about the hinge 36 relative to the carrier 32 between the closed orientation of the rear door 30 (FIGS. 1 and 6) and the intermediate orientation (FIG. 7).

The linear movement device 40 has a first end attached to a rearward area of the carrier 32 for movement therewith and a second end attached to the rear door 30 at a location spaced apart from the hinge 36. In the depicted embodiment, the hinge 36 is fixed to an upper end of the rear door 30 relative to the rear door 30 being in the closed orientation shown in FIG. 6. The linear movement device 40 is fixed to a mid-section of the rear door 30 spaced apart from the hinge 36, also relative to the rear door 30 being in the closed orientation shown in FIG. 6.

The linear movement device 40 is configured to move the rear door 30 between the door closed orientation shown in FIG. 6 and the intermediate orientation shown in FIG. 7 and maintain the rear door 30 in the intermediate orientation when the carrier 32 is moved to its forward location, as shown in FIG. 8. The linear movement device 40 can be either a pneumatically or hydraulically actuated piston device operable to move the rear door 30 between the door closed orientation and the intermediate orientation. Alternatively, the linear movement device 40 is a pneumatic piston biased to move the rear door 30 from the door closed orientation to the intermediate orientation and maintain the rear door 30 in the intermediate orientation when the carrier 32 is moved to bring the rear door 30 to the door open orientation. Still further, the linear movement device 30 can alternatively be an electrically powered linear movement device operable to move the rear door 30 between the door closed orientation and the intermediate orientation.

As shown schematically in FIG. 6, the rear door 30 is retained in the closed orientation via the mechanical configuration of a latch mechanism L shown in FIGS. 6-8. When a switch 52 is operated, the rear door 30 is released from a locked condition so that the linear movement device 40 can urge or be operated to move the rear door 30 upward to the intermediate orientation shown in FIG. 7 pivoting about the hinge 36.

Once in the intermediate orientation shown in FIG. 7, the carrier 32 can be moved by the motor 34 from rearward location shown in FIG. 7 to the forward location shown in FIG. 8.

Figure 9:
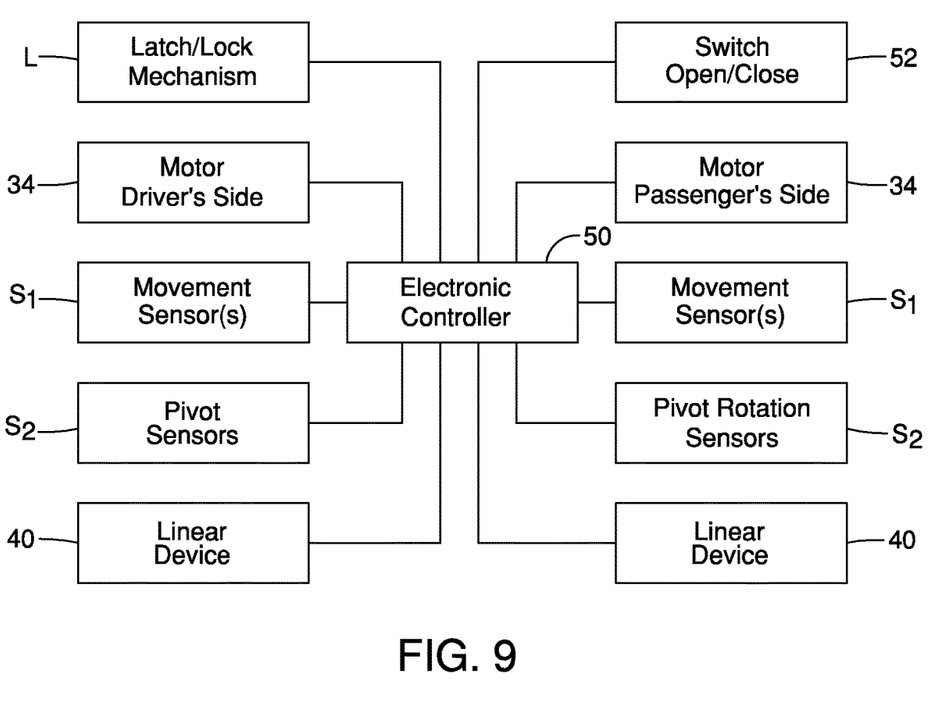
FIG. 9 is a block diagram showing an electronic controller connected to the motors that control linear movement of the carrier, the linear movement devices that control pivoting movement of the rear door about the hinge relative to the bracket and sensors that provide signals to the electronic controller indicated current position and orientation of the carrier and angular orientation of the rear door relative to the carrier in accordance with the first embodiment.

As shown in the block diagram in FIG. 9, an electronic controller 50 is connected to the motors 34 that control linear movement of the carrier 32 along the tracks 46 within the recessed areas 42. The electronic controller 50 is further connected to the linear movement mechanisms 40 that control movement of the rear door about the hinges 36 between the door closed orientation and the intermediate orientation. The electronic controller 50 is further attached to movement sensors $S_1$ located either along the tracks 46 or within the motors 34. The movement sensors $S_1$ are constructed and positioned to detect the location of the carrier 32. Specifically, the movement sensors $S_1$ send signals to the electronic controller 50 indicating whether or not the carrier 32 is located or has been moved to either its forward location (FIG. 8) or its rearward location (FIGS. 6 and 7).

The electronic controller 50 is further attached to pivot sensors $S_2$ located either on or within the hinges 36 or in the linear movement devices 40. The pivot sensors $S_2$ send signals to the electronic controller 50 indicating the angular position of the rear door 30 and specifically whether or not the rear door 30 has been moved relative to the hinge 36 to the closed orientation shown in FIG. 6, or in the intermediate orientation shown in FIG. 7 (and FIG. 8).

The electronic controller 50 is further electronically connected to the switch 52 installed to the rear door 30 and the latch mechanism L installed to the vehicle body structure 14 adjacent a lower end of the rear opening 26 of the vehicle 10. A second switch (not shown) can be installed in a keyfob and/or in the instrument panel (not shown) of the vehicle 10.

The electronic controller 50 is configured such that with the rear door 30 in the closed orientation, in response to activation of the switch mechanism 52, the electronic controller 50 unlocks the latch mechanism L releasing the rear door 30 from a locked condition. Once unlocked, the electronic controller 50 operates the linear movement device 40 to move the rear door from the door closed orientation (FIG. 6) to the intermediate orientation (FIG. 7) pivoting the rear door 30 about the hinge 36. During this pivoting movement, the carrier 32 remains stationary in its rearward position depicted in FIGS. 6 and 7. Once the rear door 30 is in the intermediate orientation depicted in FIG. 7, the pivot sensors $S_2$ detect that the rear door 30 is moved to the intermediate orientation. In response, the electronic controller 50 ceases operation of the linear movement device 40 and begins operating the motor 34 to move the carrier 32 and the rear door 30 in a forward direction such that the carrier 32 moves from the rearward position depicted in FIGS. 6 and 7 to the forward position shown in FIG. 8, thereby moving the rear door 30 from the intermediate orientation to the door open orientation. When the movement sensors $S_1$ send signals to the electronic controller 50 indicating that the carrier 32 is in the forward position shown in FIG. 8, the electronic controller 50 ceases operating the motor 34.

The electronic controller 50 is further configured such that with the rear door 30 in the open orientation and the carrier 32 in the forward position shown in FIG. 8, in response to activation of the switch mechanism 52, the electronic controller 50 operates the motor 34 to move the carrier 32 from the forward position shown in FIG. 8 to the rearward position shown in FIG. 7. Once the movement sensors $S_1$ send signals indicating that the carrier 32 is in the rearward location shown in FIG. 7, the electronic controller 50 ceases operating the motor 34. Thereafter, the electronic controller 50 operates the linear movement device 40 to pivot the rear door 30 down from the intermediate orientation depicted in FIG. 7 to the closed orientation shown in FIG. 8. At this time, the latch mechanism L locks the rear door 30 in the closed orientation.

The electronic controller 50 preferably includes a microcomputer with a door assembly operation control program that controls the movement of the carrier 32 and the rear door 30, as discussed herein. The electronic controller 50 can also include other conventional components such as an input interface circuit, an output interface circuit, and storage devices such as a ROM (Read Only Memory) device and a RAM (Random Access Memory) device. The microcomputer of the electronic controller 50 is programmed to control the motor 34 and the linear movement device 40 in response to signals from the switch 52, the latch mechanism L, the sensors $S_1$ and the sensors $S_2$. The electronic controller 50 is operatively coupled to the elements and components identified in FIG. 9 in a conventional manner.

Second Embodiment

Figure 10:
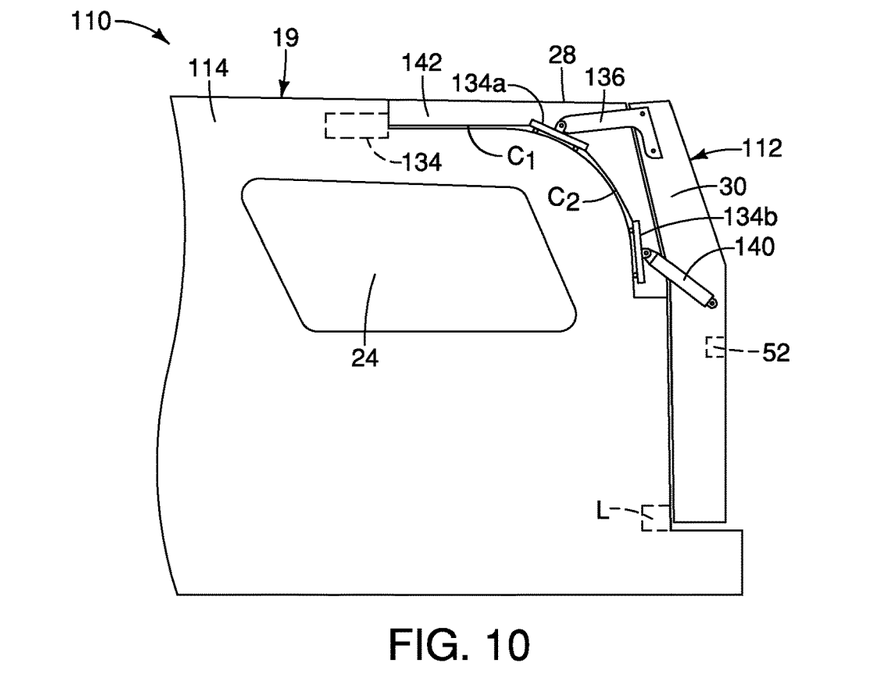
FIG. 10 is a first side schematic view of the rear area of the vehicle showing a recessed area with a curved lower surface with a first carrier that is connected to a hinge of the rear door, with the rear door in the closed orientation and a second carrier that supports a linear movement device 40 in accordance with a second embodiment.
Figure 11:
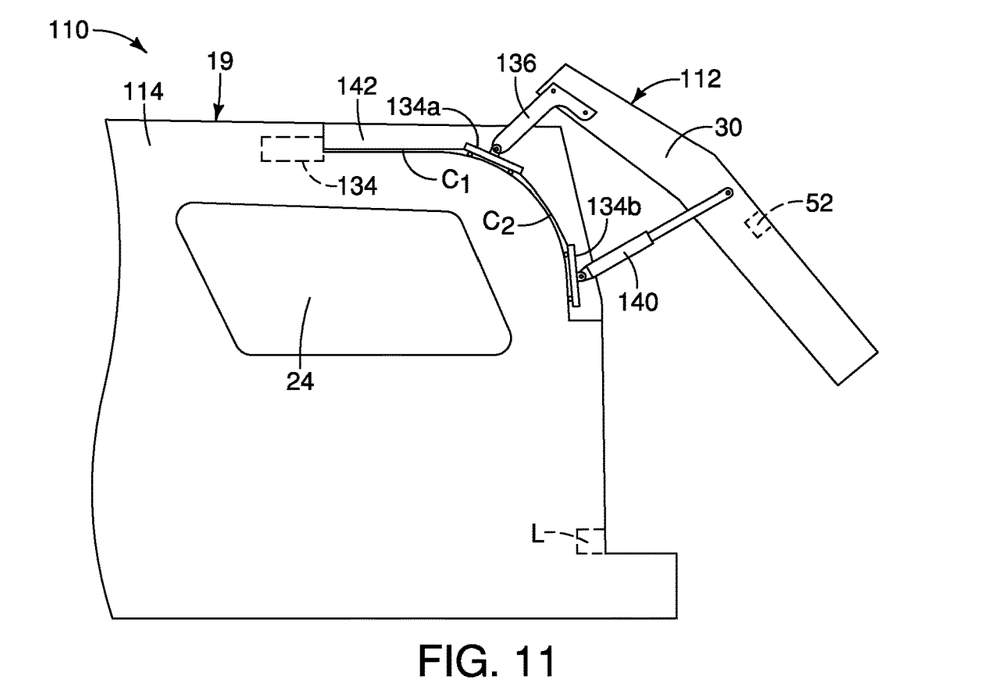
FIG. 11 is a second side schematic view of the vehicle similar to FIG. 10 showing the rear door pivoted upward by the linear movement device relative to the second carrier about the hinge of the rear door, the hinge being installed to the first carrier, with the first and second carriers in corresponding rearward positions such that the rear door is in an intermediate orientation in accordance with the second embodiment.
Figure 12:
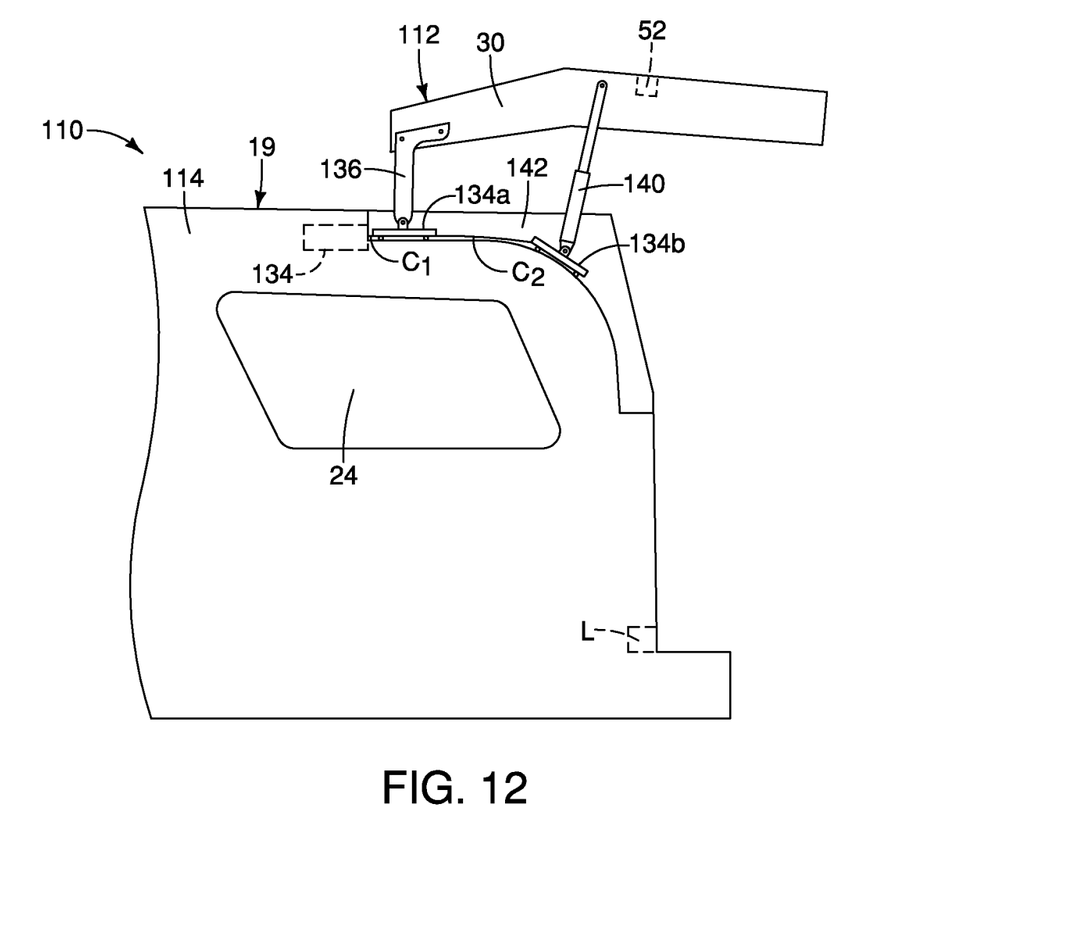
FIG. 12 is a third side schematic view of the vehicle similar to FIGS. 10 and 11 showing the first and second carriers moved to corresponding forward positions by the motor such that the rear door is moved forward to a fully open orientation exposing the rear opening of the vehicle in accordance with the second embodiment.

Referring now to FIGS. 10-12, a vehicle 110 has rear door assembly 112 attached to a vehicle body structure 114 of the vehicle 110 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle body structure 114 has a roof structure 19 that is basically the same as in the first embodiment. However, in the second embodiment, a recessed area 142 has a level section (relative to the vehicle 110 being on level ground) and a curved section that is rearward of the level section. The rear door assembly 112 includes the rear door 30. In the second embodiment, the carrier 32 of the first embodiment is replaced with a first carrier 134a and a second carrier 134b. The first carrier 134a and the second carrier 134b are retained on tracks (not shown) within the recessed area 142.

A motor 134 installed below the roof structure 19 and at least partially within the vehicle body structure 114 is attached to a first cable $C_1$. The first cable $C_1$ is further connected to the first carrier 134a. A second cable $C_2$ is attached to the first carrier 134a and the second carrier 134b. When the motor 134 is operated, the motor 134 can move the first carrier 134a and the second carrier 134b between their respective rearward positions shown in FIGS. 10 and 11 and their corresponding forward positions shown in FIG. 12.

The hinge 36 is fixed to an upper end of the rear door 30 as shown in FIGS. 10-12. A pivot end of the hinge 36 is fixedly attached to the first carrier 134a. A linear movement device 140 is attached to the second carrier 134b and to a mid-section of the rear door 30 below and spaced apart from the hinge 36.

As with the first embodiment, the electronic controller 50 can be connected to the motor 134 and the linear movement device 140 operating them in a manner similar to that described above with respect to the first embodiment.

In the second embodiment, when the switch 52 is operated with the rear door 30 in the closed orientation shown in FIG. 10, the electronic controller 50 operates the latch mechanism L to release the rear door 30. Then the electronic controller 50 operates the linear movement device 40 to raise the rear door 40 from the closed orientation shown in FIG. 10 to an intermediate orientation shown in FIG. 11. Once the rear door 30 is raised to the intermediate orientation, the electronic controller 50 ceases operating the linear movement device 140 and begins to operate the motor 134 pulling the cable $C_1$ and consequently pulling the first carrier 134a and the second carrier 134b from their respective rearward positions shown in FIGS. 10 and 11 to their respective forward positions shown in FIG. 12. This movement brings the rear door 30 to its fully open orientation shown in FIG. 12. Since the hinge 36 is fixed to the first carrier 134a and the linear movement device 40 is fixed to the second carrier 134b, the rear door 30 moves with the first carrier 134a and the second carrier 134b.

With the rear door 30 in the fully open orientation shown in FIG. 12, the switch 52 can again be operated to close the rear door 30. When operated, the switch 52 causes the electronic controller 50 to reverse the operations described above, thereby closing the rear door 30.

The various structural elements and components of the vehicle 10 other than those associated with the rear door assembly 12 are conventional components that are well known in the art. Since these structural elements and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the rear door assembly. Accordingly, these terms, as utilized to describe the present invention should be interpreted relative to a vehicle equipped with the rear door assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A rear door assembly, comprising:
    a vehicle body structure having a rear portion that defines a rear opening and a roof structure;
    a carrier movable along a portion of the roof structure between a rearward location to a forward location;
    a motor attached to the roof structure and the carrier, the motor being operable to move the carrier relative to the roof structure and the rear opening between the rearward location and the forward location;
    a rear door having a hinge pivotally supported to the carrier for movement therewith, the rear door being movable between a door closed orientation covering the rear opening, an intermediate orientation partially exposing the rear opening and a door open orientation exposing the rear opening, and
    a linear movement device having a first end attached to the carrier for movement therewith and a second end attached to the rear door at a location spaced apart from the hinge.

2. The rear door assembly according to claim 1, wherein the linear movement device is configured to move the rear door between the door closed orientation and the intermediate orientation, the intermediate orientation being between the door closed orientation and the door open orientation.

3. The rear door assembly according to claim 1, wherein with the rear door in the intermediate orientation the motor is configured to move the carrier and the rear door between the intermediate orientation and the door open orientation, such that with the carrier in the rearward location the rear door is located in the intermediate orientation and with the carrier moved to the forward location the rear door is located in the door open orientation.

4. The rear door assembly according to claim 1, wherein the portion of the roof structure is a recessed area having a trim member that at least partially covers the recessed area and the carrier.

5. The rear door assembly according to claim 4, wherein the carrier is configured to roll along tracks fixed to the roof structure within the recessed area.

6. The rear door assembly according to claim 4, wherein the carrier is configured to slide along low friction sliders fixed to the roof structure within the recessed area.

7. The rear door assembly according to claim 4, wherein the linear movement device is configured to move the rear door between the door closed orientation and the intermediate orientation.

8. The rear door assembly according to claim 7, wherein
with the rear door in the intermediate orientation the motor is configured to move the carrier and the rear door between the intermediate orientation and the door open orientation, such that with the carrier in the rearward location the rear door is located in the intermediate orientation and with the carrier moved to the forward location the rear door is located in the door open orientation.

9. The rear door assembly according to claim 1, wherein the linear movement device is a pneumatic piston biased to move the rear door from the door closed orientation toward the door open orientation.

10. The rear door assembly according to claim 9, wherein the linear movement device is configured to move the rear door between the door closed orientation and the intermediate orientation, the intermediate orientation being between the door closed orientation and the door open orientation.

11. The rear door assembly according to claim 10, wherein
with the rear door in the intermediate orientation the motor is configured to move the carrier and the rear door between the intermediate orientation and the door open orientation, such that with the carrier in the rearward location the rear door is located in the intermediate orientation and with the carrier moved to the forward location the rear door is located in the door open orientation.

12. The rear door assembly according to claim 11, further comprising
an electronic controller electronically connected to the motor, a sensor, a latch mechanism and a switch mechanism such that in response to activation of the switch mechanism, the controller unlocks the latch mechanism releasing the rear door allowing the linear movement device to move the door from the door closed orientation to the intermediate orientation and in response to the sensor detecting that the rear door is moved to the intermediate orientation, the electronic controller operates the motor to move the carrier and the rear door from the intermediate orientation to the door open orientation.

13. The rear door assembly according to claim 1, wherein the linear movement device is a pneumatically or hydraulically actuated piston device operable to move the rear door between the door closed orientation and the intermediate orientation.

14. The rear door assembly according to claim 13, further comprising
an electronic controller electronically connected to the motor, a sensor, a latch mechanism, the linear movement device and a switch mechanism such that in response to activation of the switch mechanism, the controller unlocks the latch mechanism releasing the rear door, operates the linear movement device to move the door from the door closed orientation to the intermediate orientation and in response to the sensor detecting that the rear door is moved to the intermediate orientation, the electronic controller operates the motor to move the carrier and the rear door from the intermediate orientation to the door open orientation.

15. The rear door assembly according to claim 1, wherein the linear movement device is an electrically powered linear movement device operable to move the rear door between the door closed orientation and the intermediate orientation.

16. The rear door assembly according to claim 15, further comprising
an electronic controller electronically connected to the motor, a sensor, a latch mechanism, the linear movement device and a switch mechanism such that in response to activation of the switch mechanism, the controller unlocks the latch mechanism releasing the rear door, operates the linear movement device to move the door from the door closed orientation to the intermediate orientation and in response to the sensor detecting that the rear door is moved to the intermediate orientation, the electronic controller operates the motor to move the carrier and the rear door from the intermediate orientation to the door open orientation.

* * * * *